US011515588B2

(12) United States Patent
Du et al.

(10) Patent No.: US 11,515,588 B2
(45) Date of Patent: Nov. 29, 2022

(54) HEATING METHOD FOR RECHARGEABLE BATTERY, CONTROL UNIT AND HEATING CIRCUIT

(71) Applicant: CONTEMPORARY AMPEREX TECHNOLOGY CO., LIMITED, Ningde (CN)

(72) Inventors: Xinxin Du, Ningde (CN); Zhimin Dan, Ningde (CN); Fuping Luo, Ningde (CN); Shengwei Wang, Ningde (CN); Tiancong Wang, Ningde (CN); Xiyang Zuo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 470 days.

(21) Appl. No.: 16/860,408

(22) Filed: Apr. 28, 2020

(65) Prior Publication Data
US 2020/0381788 A1 Dec. 3, 2020

(30) Foreign Application Priority Data
May 28, 2019 (CN) .......................... 201910449490.6

(51) Int. Cl.
*H01M 10/637* (2014.01)
*H01M 10/615* (2014.01)
*H02J 7/00* (2006.01)

(52) U.S. Cl.
CPC ....... *H01M 10/637* (2015.04); *H01M 10/615* (2015.04); *H02J 7/0047* (2013.01)

(58) Field of Classification Search
CPC ............. H01M 10/637; H01M 10/615; H01M 10/633; H01M 10/625; H01M 10/63; H01M 10/6571; H02J 7/0047; Y02E 60/10
See application file for complete search history.

(56) References Cited

U.S. PATENT DOCUMENTS 5,504,415 A * 4/1996 Podrazhansky ....... H02J 7/0016
320/152
6,441,588 B1 * 8/2002 Yagi ....................... B60L 58/27
320/150

(Continued)

FOREIGN PATENT DOCUMENTS

CN 102473976 A 5/2012
CN 104064836 A 9/2014

(Continued)

OTHER PUBLICATIONS

Contemporary Amperex Technology Co., Limited, Decision to Grant a Patent with English Translation, JP 2019-237614, dated Sep. 9, 2021, 5 pgs.

(Continued)

*Primary Examiner* — Jack Chiang
*Assistant Examiner* — Brandon Bowers
(74) *Attorney, Agent, or Firm* — Kilpatrick Townsend & Stockton LLP

(57) ABSTRACT

Disclosed are a heating method for a rechargeable battery, a control unit and a heating circuit. The heating method comprises: determining a frequency value of a pulse current for heating the rechargeable battery in response to a heating command of the rechargeable battery; determining a current value of the pulse current according to the frequency value and an acquired state parameter of the rechargeable battery; judging whether the current value satisfies a preset heating demand; if the current value satisfies the heating demand, generating the pulse current under control according to the frequency value; if the current value does not satisfy the heating demand, re-determining the frequency value and the current value of the pulse current. The embodiments of the present disclosure further provide a control unit and a heating circuit.

19 Claims, 9 Drawing Sheets

(56) References Cited

U.S. PATENT DOCUMENTS

| | | | | |
|---|---|---|---|---|
| 8,334,675 | B2* | 12/2012 | Wang | H02J 7/007192 320/129 |
| 2013/0134945 | A1 | 5/2013 | Xu et al. | |
| 2013/0211642 | A1* | 8/2013 | Blasinski | H02J 7/0069 903/903 |
| 2014/0285135 | A1* | 9/2014 | Ji | H01M 10/615 320/129 |
| 2018/0358829 | A1 | 12/2018 | Rastegar et al. | |

FOREIGN PATENT DOCUMENTS

| | | | |
|---|---|---|---|
| CN | 104835994 | A | 8/2015 |
| CN | 102742068 | B | 1/2016 |
| CN | 204966636 | U | 1/2016 |
| CN | 105680114 | A | 6/2016 |
| CN | 104064836 | B | 7/2016 |
| CN | 106532187 | A | 3/2017 |
| CN | 107039708 | A | 8/2017 |
| CN | 108682909 | A | 10/2018 |
| CN | 108711662 | A | 10/2018 |
| CN | 109659637 | A | 4/2019 |
| CN | 109728382 | A | 5/2019 |
| CN | 109768352 | A | 5/2019 |
| CN | 109786878 | A | 5/2019 |
| CN | 109786897 | A | 5/2019 |
| CN | 109786898 | A | 5/2019 |
| CN | 110970691 | A | 4/2020 |
| DE | 102015015007 | A1 | 7/2016 |
| JP | 2011138672 | A | 7/2011 |
| JP | 2011254673 | A | 12/2011 |
| JP | 2016119266 | A | 6/2016 |
| TW | I465001 | B | 12/2014 |

OTHER PUBLICATIONS

Contemporary Amperex Technology Co., Limited, Decision to Grant a Patent with English Translation, CN 201910449490.6, dated Aug. 5, 2021, 6 pgs.

Office Action for Chinese Patent Application No. 201910449490.6 dated Jan. 5, 2021.

Extended European Search Report for European Patent Application No. 20172280.8 dated Jan. 12, 2021.

International Search Report (and English translation) and Written Opinion of the International Searching Authority for International Application No. PCT/CN2020/085485 dated Jul. 22, 2020.

Office Action for Japanese Patent Application No. 2019/237614 dated Mar. 1, 2021.

* cited by examiner

HEATING METHOD FOR RECHARGEABLE BATTERY, CONTROL UNIT AND HEATING CIRCUIT

CROSS-REFERENCE TO RELATED APPLICATION

This application claims the priority benefit of Chinese Patent Application No. 201910449490.6 filed on May 28, 2019 and entitled "HEATING METHOD FOR RECHARGEABLE BATTERY, CONTROL UNIT AND HEATING CIRCUIT", the disclosure of which is incorporated by reference herein in its entirety.

TECHNICAL FIELD

Embodiments of the present disclosure relate to battery heating technologies, and more particularly, to a heating method for a rechargeable battery, a control unit and a heating circuit.

BACKGROUND

In recent years, with development of new energy vehicle technologies, new energy vehicles are favored by more and more consumers. For a rechargeable battery as a core component of a new energy vehicle, charge and discharge capacity thereof is an important factor in performance of the vehicle. A lithium battery is the first choice for the rechargeable battery in the new energy vehicle due to its advantages such as high single-cell voltage, high energy density and long service life. Usually, the rechargeable battery in the new energy vehicle is a battery pack formed by a plurality of battery cells connected in series and/or in parallel.

The existing technology at least has the problem that: at a low temperature, polarization of the lithium battery is increased, and it is necessary to decrease a charging current under a condition of a healthy charging interval, which results in a longer charging period of the battery cells in a low-temperature environment; in addition, increase of polarization of the lithium battery also reduces capacity retention rate of the battery cells.

SUMMARY

An object of the embodiments of the present disclosure is to provide a heating method for a rechargeable battery, a control unit and a heating circuit, and to provide a manner for heating the rechargeable battery, in order to overcome adverse effects brought by battery polarization at a low temperature as much as possible, and to achieve a heating demand of the rechargeable battery more quickly.

In order to solve the above-described technical problem, an embodiment of the present disclosure provides a heating method for a rechargeable battery, including: determining, in response to a heating command of the rechargeable battery, a frequency value of a pulse current for heating the rechargeable battery; determining, according to the frequency value and an acquired state parameter of the rechargeable battery, a current value of the pulse current; judging whether the current value satisfies a preset heating demand; if the current value satisfies the heating demand, controlling to generate the pulse current according to the frequency value; if the current value does not satisfy the heating demand, re-determining the frequency value and the current value of the pulse current.

An embodiment of the present disclosure further provides a control unit in a heating circuit, the heating circuit includes a rechargeable battery, an energy storage unit, a switch unit, and the control unit; the rechargeable battery, the energy storage unit and the switch unit are connected in series and forming a loop, the control unit is connected to the switch unit; the control unit is configured to execute the above-described heating method for the rechargeable battery; wherein, the control unit controls ON or OFF of the switch unit according to the frequency value, to generate the pulse current. In an example, the control includes at least one processor; and a memory communicably connected with the at least one processor for storing instructions executable by the at least one processor, wherein execution of the instructions by the at least one processor causes the at least one processor to perform the processing process performed by the control unit in the heating method for the rechargeable battery as described above.

An embodiment of the present disclosure further provides a heating circuit, including: a rechargeable battery, an energy storage unit, a switch unit and the above-described control unit; the rechargeable battery, the energy storage unit and the switch unit are connected in series and forming a loop, and the control unit is connected to the switch unit.

As compared with the existing technology, in the embodiments of the present disclosure, the frequency value of the pulse current for heating the rechargeable battery is determined, the current value of the pulse current is determined according to the frequency value and the state parameter of the rechargeable battery, and when the current value satisfies the heating demand, the rechargeable battery is heated under control according to the frequency value. The present disclosure provides a manner for heating the rechargeable battery, in order to overcome adverse effects brought by battery polarization at a low temperature as much as possible; besides, in the present disclosure, the frequency value of the pulse current for heating is determined according to the heating demand, and heating is performed according to the frequency value, so that heating demand may be achieved more quickly.

In addition, the state parameter includes a remaining power amount; and the determining, according to the frequency value and the acquired state parameter of the rechargeable battery, the current value of the pulse current, is specifically: determining, according to the frequency value and the remaining power amount, the current value of the pulse current. In this embodiment, the current value is determined according to the remaining power amount of the rechargeable battery that is more correlated with the current value, so that the determined current value is more in line with an actual situation.

In addition, the determining, according to the frequency value and the remaining power amount, the current value of the pulse current, is specifically implemented by using a formula below: $I=F_{soc}*(a_0+a_1*\cos((x-½f)*F)+b_1*\sin((x-½f)*F)+a_2*\cos(2*(x-½f)*F)+2*\sin(2*(x-½f)*F)+a_3*\cos(3*(x-½f)*F)+b_3*\sin(3*(x-½f)*F)+a_4*\cos(4*(x-½f)*F)+b_4*\sin(4*(x-½f)*F)+a_5*\cos(5*(x-½f)*F)+b_5*\sin(5*(x-½f)*F))$; $F_{soc}=5.947e^{-9}*soc*4.026+0.945$; $F=3.14*2*f$; where, I represents the current value; x represents a heating duration; f represents the frequency value; $a_0, a_1, a_2, a_3, a_4, a_5, b_1, b_2, b_3, b_4, b_5$ are a group of set coefficients; and soc represents the remaining power amount. This embodiment provides a specific calculation manner of determining the current value according to the remaining power amount and the frequency value; wherein, a waveform of the pulse current corresponding to the specific calculation manner is a sinusoidal wave.

In addition, after the determining the frequency value of the pulse current for heating the rechargeable battery, and before the determining, according to the frequency value and the remaining power amount, the current value of the pulse current, the method further includes: acquiring, according to a preset correspondence between the frequency value and a coefficient group, a coefficient group corresponding to the frequency value; the coefficient group includes $a_0, a_1, a_2, a_3, a_4, a_5, b_1, b_2, b_3, b_4, b_5$ in the formula. In a case where a circuit hardware configuration is invariant, different frequency values may cause actual generated current values to be different, so the parameters $a_0, a_1, a_2, a_3, a_4, a_5, b_3, b_4, b_5$ in the formula are configured according to the frequency values, so that the current value calculated according to the formula is more in line with an actual situation.

In addition, the judging whether the current value satisfies the preset heating demand, includes: estimating a theoretical heating rate of the rechargeable battery as heated by the pulse current of the current value; judging whether the theoretical heating rate and a preset target heating rate satisfy a first matching condition; if the first matching condition is satisfied, determining that the current value satisfies the heating demand; and if the first matching condition is not satisfied, determining that the current value does not satisfy the heating demand. This embodiment provides a specific setting manner required for heating and a specific judgment manner of the current value and the heating demand.

In addition, after the controlling to generate the pulse current according to the frequency value, the method further includes a detection and adjustment step; and the detection and adjustment step includes: collecting an actual current value of the generated pulse current; estimating an actual heating rate of the rechargeable battery as heated by the pulse current of the actual current value; judging whether the actual heating rate and the target heating rate satisfy a second matching condition; if the second matching condition is not satisfied, adjusting the frequency value according to a preset manner, and controlling to generate the pulse current according to the adjusted frequency value. In a case where the state parameter of the rechargeable battery has been determined, the current value is related to the frequency value; in this embodiment, the frequency value may be corrected according to the actual current value, and further the actual current value may be adjusted, so that a heating rate corresponding to the actual current value is closer to the target heating rate; so as to achieve the heating demand more quickly.

In addition, the state parameter includes the remaining power amount; and the determining the frequency value of the pulse current for heating the rechargeable battery, includes: acquiring a frequency value interval corresponding to a remaining power amount interval to which the remaining power amount belongs, according to a preset correspondence between the remaining power amount interval and the frequency value interval; and selecting one frequency value from the acquired frequency value interval, as the frequency value. In this embodiment, the frequency value determined according to the remaining power amount is more correlated with the remaining power amount, so that the current value acquired according to the frequency value and the remaining power amount is closer to the required current value; that is, under a state of the remaining power amount, a current value of the pulse current that has a higher matching degree with the heating demand may be generated under control according to the frequency value; so that the frequency value of the pulse current that satisfies the heating demand can be determined more quickly according to the remaining power amount and the heating demand.

Additionally, before the determining, in response to the heating command of the rechargeable battery, the frequency value of the pulse current for heating the rechargeable battery, the method further includes: acquiring the state parameter of the rechargeable battery, the state parameter includes the remaining power amount and a battery temperature; acquiring a temperature threshold corresponding to the remaining power amount according to a preset correspondence between the remaining power amount and the temperature threshold; and if the battery temperature is judged to be lower than the temperature threshold, generating the heating command. Considering that a polarization degree of the rechargeable battery is not only related to the battery temperature, but also related to the remaining power amount in the rechargeable battery, the temperature threshold at which heating is required currently is determined according to the remaining power amount, and the battery temperature is compared with the temperature threshold to judge whether heating is required; so that the judgment of whether heating is required is more in line with actual needs.

BRIEF DESCRIPTION OF THE DRAWINGS

One or more embodiments are exemplarily explained through the figures in the accompanying drawings corresponding thereto, these exemplary explanations do not constitute a limitation to the embodiments, elements having same reference signs are denoted as similar elements; and unless otherwise specifically declared, the figures in the accompanying drawings do not constitute a limitation of proportion.

DETAILED DESCRIPTION

In order to make objects, technical details and advantages of the embodiments of the present disclosure more apparent, hereinafter, the respective embodiments of the present disclosure will be described in detail in connection with the drawings. However, those ordinarily skilled in the art may understand that, in the respective embodiments of the present disclosure, numerous technical details are set forth in order to provide a reader with a better understanding of the present application. However, the technical solutions claimed in the present application can be implemented without these technical details and various changes and modifications based on the respective embodiments below. Respective embodiments below are divided for convenience of description and should not be construed as limiting the specific implementation mode of the present disclosure. The respective embodiments may be combined with each other and mutually referred in the non-contradictory premise.

Figure 1:
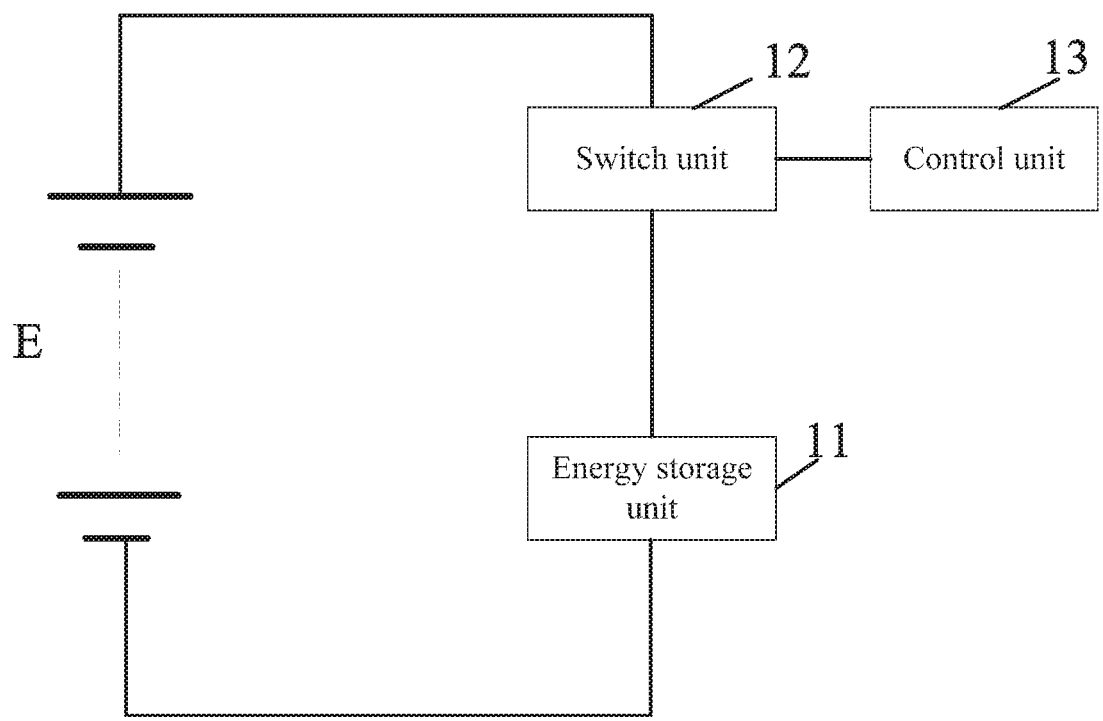
FIG. 1 is a schematic diagram of a heating circuit to which a heating method for a rechargeable battery according to the present application is applied.

Some embodiments of the present disclosure relate to a heating method for a rechargeable battery, which may be applied to an electric vehicle, and in this case, the rechargeable battery may be a power battery of the electric vehicle. FIG. 1 is a schematic diagram of a heating circuit to which the heating method is applied; wherein, a rechargeable battery E, an energy storage unit 11 and a switch unit 12 are connected in series, and a control unit 13 is connected to the switch unit 12. When the rechargeable battery E needs to be heated, the control unit 13 controls the switch unit 12 to be turned on and off at a certain frequency, so that a pulse current is generated in the heating circuit, and the pulse current is employed to heat the rechargeable battery E. It should be noted that the heating circuit shown in FIG. 1 is merely exemplary description, and the heating circuit to which the heating method is applied according to this embodiment may be designed according to actual needs.

Figure 2:
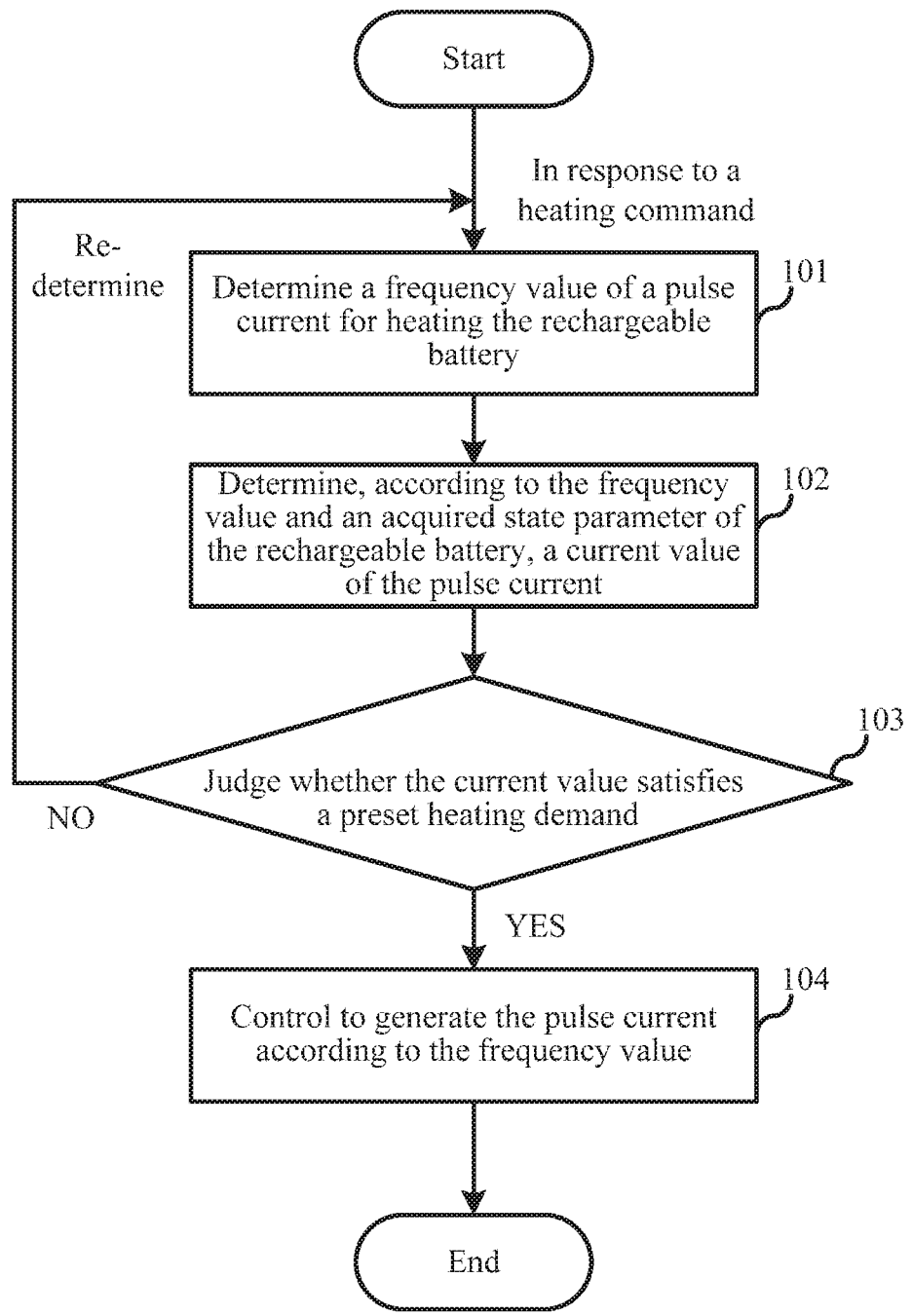
FIG. 2 is a flow chart of the heating method for the rechargeable battery according to the present application.

As shown in FIG. 2, it is a flow chart of the heating method for the rechargeable battery according to this embodiment, which includes steps of:

Step 101: determining a frequency value of a pulse current for heating the rechargeable battery.

Step 102: determining, according to the frequency value and an acquired state parameter of the rechargeable battery, a current value of the pulse current.

Step 103: judging whether the current value satisfies a preset heating demand; if YES, proceeding to step 104; if NO, returning to step 101.

Step 104: controlling to generate the pulse current according to the frequency value.

As compared with the existing technology, in the embodiment of the present disclosure, the current value of the pulse current is determined according to the frequency value of the pulse current and the state parameter of the rechargeable battery, and when the current value satisfies the heating demand, the pulse current is generated under control according to the frequency value, to heat the rechargeable battery. The present disclosure provides a manner for heating the rechargeable battery, in order to overcome adverse effects brought by battery polarization at a low temperature as much as possible; besides, in the present disclosure, the frequency value of the pulse current for heating is determined according to the heating demand, and heating is performed under control according to the frequency value, so that the heating demand may be achieved more quickly.

Hereinafter, implementation details of the heating method for the rechargeable battery according to this embodiment will be specifically described; following contents are merely implementation details provided to facilitate understanding, and are not necessary for implementing the solution.

Figure 3:
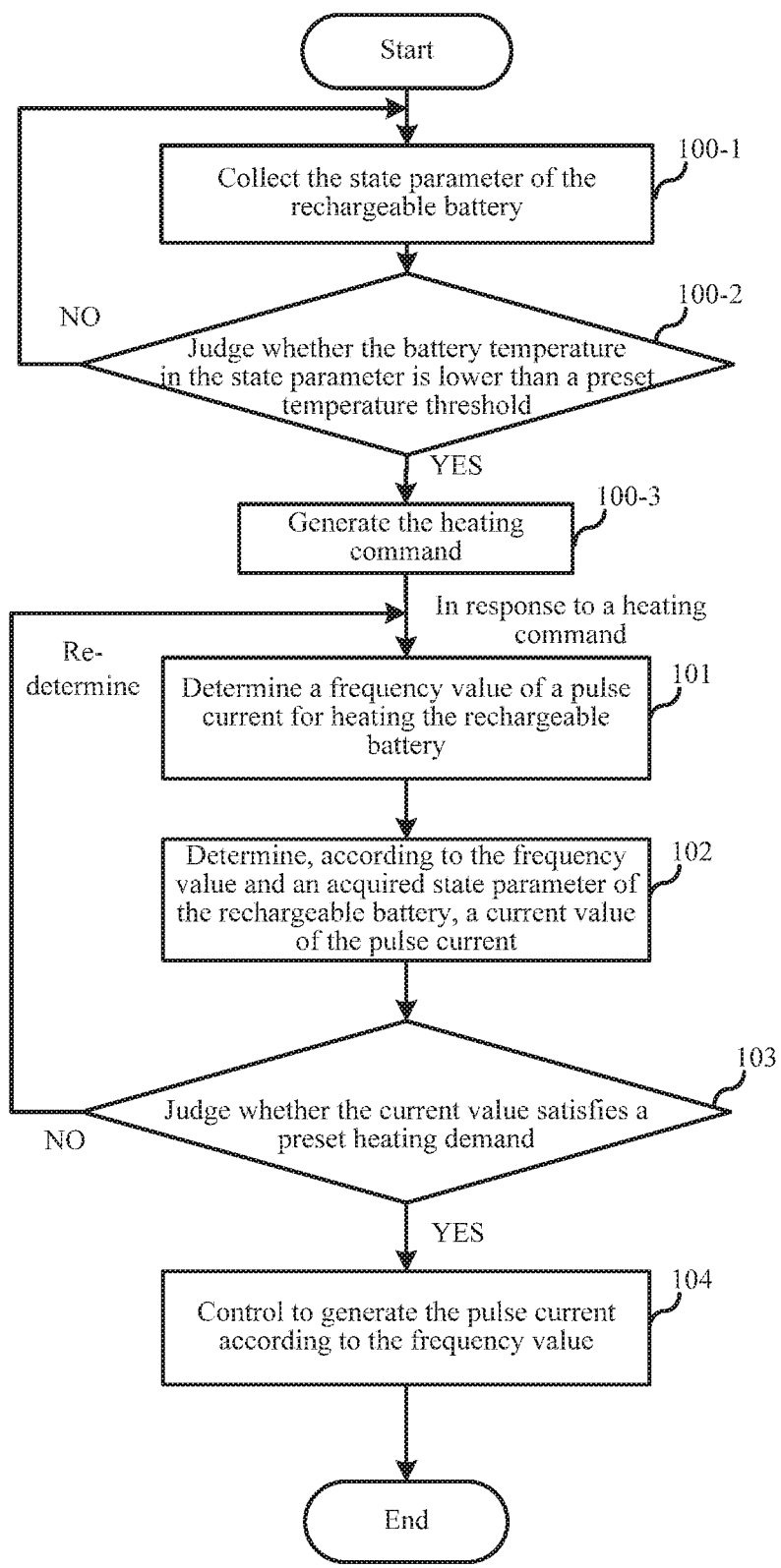
FIG. 3 is a specific flow chart of an example of generating a heating command according to the present application.

When the rechargeable battery needs to be heated, the control unit 13 generates a heating command for the rechargeable battery; and in response to the heating command, the control unit 13 executes step 101. Wherein, the heating command may be generated in various manners: in an example, whether to generate the heating command may be judged according to the collected state parameter of the rechargeable battery; FIG. 3 shows a flow chart of the example; and specifically, before step 101, the method further includes steps of:

Step 100-1: collecting the state parameter of the rechargeable battery; the state parameter includes at least a battery temperature of the rechargeable battery.

Step 100-2: judging whether the battery temperature in the state parameter is lower than a preset temperature threshold; if YES, proceeding to step 100-3; if NO, returning to step 100-1.

Step 100-3: generating the heating command.

In the example of FIG. 3, the control unit 13 may periodically collect the state parameter of the rechargeable battery E, the state parameter at least includes the battery temperature of the rechargeable battery; the control unit 13 may compare the battery temperature with the preset temperature threshold; if the battery temperature is lower than the preset temperature threshold, it indicates that a temperature of the rechargeable battery E is too low, and in this case, the heating command of the rechargeable battery E is generated inside the control unit 13. The state parameter of the rechargeable battery E may further include a voltage value, a current value, a remaining power amount, etc., of the rechargeable battery E.

It should be noted that, in other examples, the user may actively input the heating command for the rechargeable battery E (for example, the user actively inputs in cold weather).

In step 101, in response to the heating command, the control unit 13 firstly determines the frequency value of the pulse current for heating the rechargeable battery. Specifically, the control unit 13 may have an optional frequency range preset therein, for example, the frequency range is 300 HZ to 5000 HZ, or the frequency range is 900 HZ to 3000 HZ. The control unit 13 may arbitrarily select a frequency value from the preset frequency range, as the determined frequency value. The preset frequency range may be determined according to a heating rate range required for the rechargeable battery; specifically, the higher the required heating rate, the larger the current value of the required pulse current, and the smaller the frequency value.

In step 102, the control unit 13 may determine the current value of the pulse current, according to the frequency value determined in step 101 and the state parameter acquired in advance. In the example of FIG. 3, the state parameter employed in step 102 is the state parameter collected in step 100-1, the state parameter includes the remaining power amount of the rechargeable battery; and the control unit 13 determines the current value according to the frequency value and the remaining power amount.

It should be noted that, in other examples, if the heating command is input by the user, then in step 102, the control unit 13 needs to collect the state parameter of the rechargeable battery firstly, and then determine the current value according to the frequency value determined in step 101 and the collected state parameter.

Figure 4:
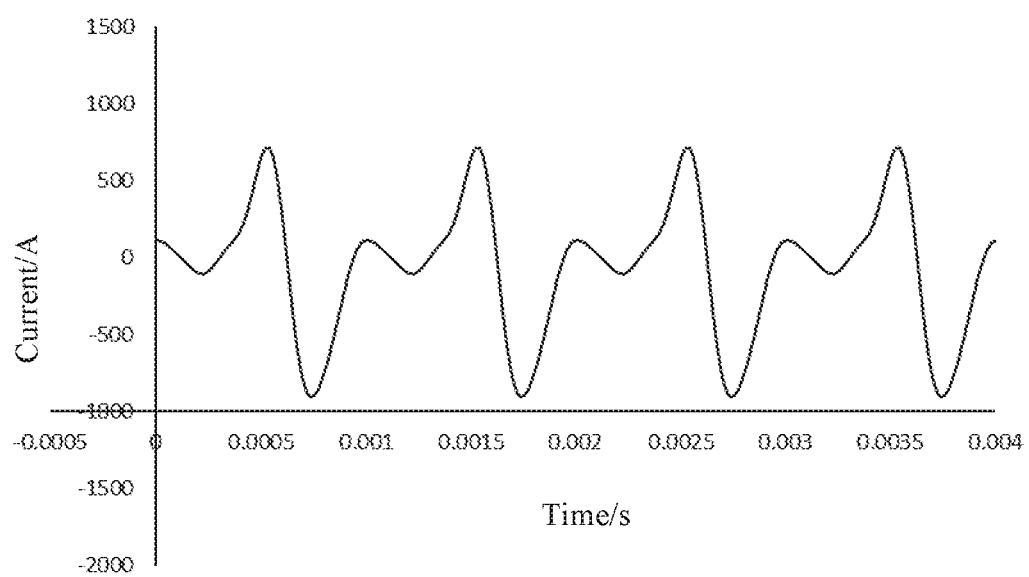
FIG. 4 is a schematic diagram of a waveform of a sinusoidal-like wave according to the present application.

In an example, a waveform of the pulse current is a sinusoidal-like wave; as shown in FIG. 4, it is a schematic diagram of the waveform of the sinusoidal-like wave; and the waveform shown in FIG. 4 is only for illustrative description, but it is not limited thereto. The heating circuit is configured by hardware as a circuit for generating a sinusoidal-like current, and a circuit model of the heating circuit may be expressed by using a formula below:

$$I = F_{soc} * (a_0 + a_1 * \cos((x - \tfrac{1}{2}f) * F) + b_1 * \sin((x - \tfrac{1}{2}f) * F) + a_2 * \cos(2 * (x - \tfrac{1}{2}f) * F) + 2 * \sin(2 * (x - \tfrac{1}{2}f) * F) + a_3 * \cos(3 * (x - \tfrac{1}{2}f) * F) + b_3 * \sin(3 * (x - \tfrac{1}{2}f) * F) + a_4 * \cos(4 * (x - \tfrac{1}{2}f) * F) + b_4 * \sin(4 * (x - \tfrac{1}{2}f) * F) + a_5 * \cos(5 * (x - \tfrac{1}{2}f) * F) + b_5 * \sin(5 * (x - \tfrac{1}{2}f) * F));$$   Formula (1)

$$F_{soc} = 5.947 e^{-9} * soc * 4.026 + 0.945;$$   Formula (2)

$$F = 3.14 * 2 * f;$$   Formula (3)

Where, I represents the current value of the pulse current generated by the heating circuit; x represents a heating duration; f represents the frequency value of the pulse current; $a_0, a_1, a_2, a_3, a_4, a_5, b_1, b_2, b_3, b_4, b_5$ are a group of set coefficients; and soc represents the remaining power amount of the rechargeable battery. In addition, those skilled in the art should know that, e in Formula (2) is a constant, and no details will be repeated here.

$F_{soc}$ is related to the remaining power amount soc, Formula (2) expresses a specific relationship between $F_{soc}$ and the remaining power amount soc, F is related to the frequency value f, Formula (3) represents a specific relationship between F and the frequency value f; Formula (1) represents a specific relationship of the current value I with the frequency value f, $F_{soc}$, and F; and therefore, the current value I is related to the frequency value f and the remaining power amount soc. Coefficient values of the group of coefficients $a_0, a_1, a_2, a_3, a_4, a_5, b_1, b_2, b_3, b_4, b_5$ reflect an amplitude of a current that the circuit model can generate; the group of coefficients may be preset; for example, preferred values of the group of coefficients are obtained through experiments, so that the circuit model obtained thereby more accurately reflects the heating circuit.

The frequency value of the pulse current determined in step 101 is the frequency at which the control unit 13 controls the switch unit 12 to be turned on and off; that is, if the switch unit 12 is controlled to be turned on and off at the frequency value, the heating circuit will generate the pulse current of the above-described frequency value therein, and the current value of the pulse current is the current value calculated by using Formula (1).

In an actual heating process, in a case where a hardware configuration of the heating circuit is invariant, the current value of the pulse current generated by the heating circuit may be affected by the frequency value of the pulse frequency; that is, the circuit model of the heating circuit may actually change accordingly due to the change in the frequency value of the pulse current. Therefore, in an example, the correspondence between the frequency value and the coefficient group may be preset; where, one coefficient group is just a group of values of $a_0, a_1, a_2, a_3, a_4, a_5, b_1, b_2, b_3, b_4, b_5$. After the frequency value is determined, the coefficient group corresponding to the frequency value is acquired. The values of $a_0, a_1, a_2, a_3, a_4, a_5, b_1, b_2, b_3, b_4, b_5$ determined thereby can more accurately reflect the circuit model at the frequency value, so that the current value calculated based on the circuit model is closer to the actual current value.

It should be noted that, the waveform of the pulse current is not only limited to the sinusoidal-like wave; any waveform type of pulse current that can heat the rechargeable battery belongs to the scope of the present application.

Figure 5:
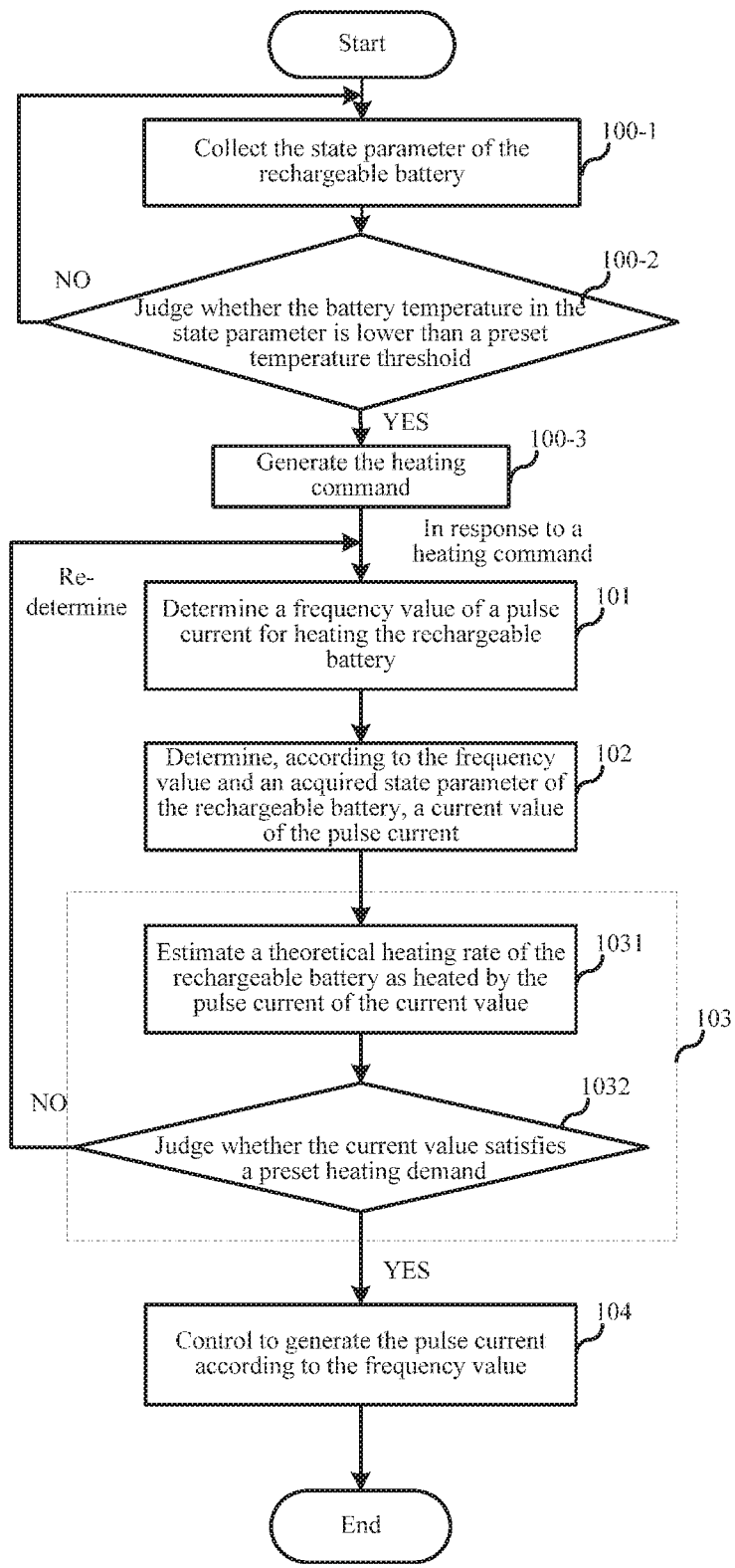
FIG. 5 is a specific flow chart of an example of judging whether the heating demand is satisfied according to the present application.

A heating demand is preset in the control unit 13, and the heating demand may include a target heating rate, for example, the rechargeable battery is heated by 1° C. per minute. As shown in FIG. 5, step 103 may specifically include a plurality of sub-steps of:

Sub-step 1031: estimating a theoretical heating rate of the rechargeable battery as heated by the pulse current of the current value.

Sub-step 1032: judging whether the theoretical heating rate and the preset target heating rate satisfy a first matching condition.

That is, the theoretical heating rate of the rechargeable battery as heated by the pulse current of the current value is estimated firstly according to the current value calculated by using Formula (1), that is, the theoretical heating rate can be calculated according to parameters such as the estimated current value, mass of battery cells of the rechargeable battery E, specific heat capacity of the battery cells, thermal conductivity of the battery cells; then, it is judged whether the theoretical heating rate and the target heating rate satisfy the first matching condition. Wherein, the first matching condition may be that: a difference between the theoretical heating rate and the target heating rate is less than a preset first difference.

When the theoretical heating rate and the target heating rate satisfy the first matching condition, it indicates that the current value generated under control according to the frequency value determined in step 101 is considered to be able to satisfy the heating demand; at this time, it is judged that the current value satisfies the heating demand, and the pulse current is generated under control according to the frequency value determined in step 101, that is, the process proceeds to step 104.

When the theoretical heating rate and the target heating rate do not satisfy the first matching condition, it indicates that the current value generated under control according to the frequency value determined in step 101 is considered to be unable to satisfy the heating demand; at this time, it is judged that the current value does not satisfy the heating demand, and it is necessary to re-determine the frequency value and the current value of the pulse current, that is, the process returns to step 101.

When it is necessary to re-determine the frequency value and the current value of the pulse current, and return to step 101, an implementation manner of step 101 may be: determining an adjustment manner according to a magnitude relationship between the theoretical heating rate calculated last time and the target heating rate. It is assumed through experiments that: in a case where the hardware configuration of the heating circuit is invariant, the smaller the frequency value, the larger the current value, and the larger the heating rate; then, if the theoretical heating rate is smaller than the target heating rate, it indicates that the theoretical heating rate is too small, that is, it indicates that the current value is too small and the frequency value is too large; and therefore, the re-determined frequency value should be smaller than the frequency value determined last time. If the theoretical heating rate is larger than the target heating rate, it indicates that the theoretical heating rate is too large, that is, the current value is too large, and the frequency value is too small; and therefore, the re-determined frequency value should be larger than the frequency value determined last time; wherein, the re-determined frequency value is still within the preset frequency range. For example, the frequency value determined this time is 1000 HZ, and a judgment result in step 103 is that, the theoretical heating rate corresponding to the current value calculated according to the frequency value of 1000 HZ is smaller than the target heating rate; then it indicates that the theoretical heating rate is too small, that is, it indicates that the current value is too small, the frequency value is too large, and the frequency value should be reduced; so the re-determined frequency value should be smaller than 1000 HZ; if the preset frequency range is 900 HZ to 3000 HZ, the re-determined frequency value should be between 900 HZ to 1000 HZ, for example, the re-determined frequency value may be 950 HZ.

Figure 6:
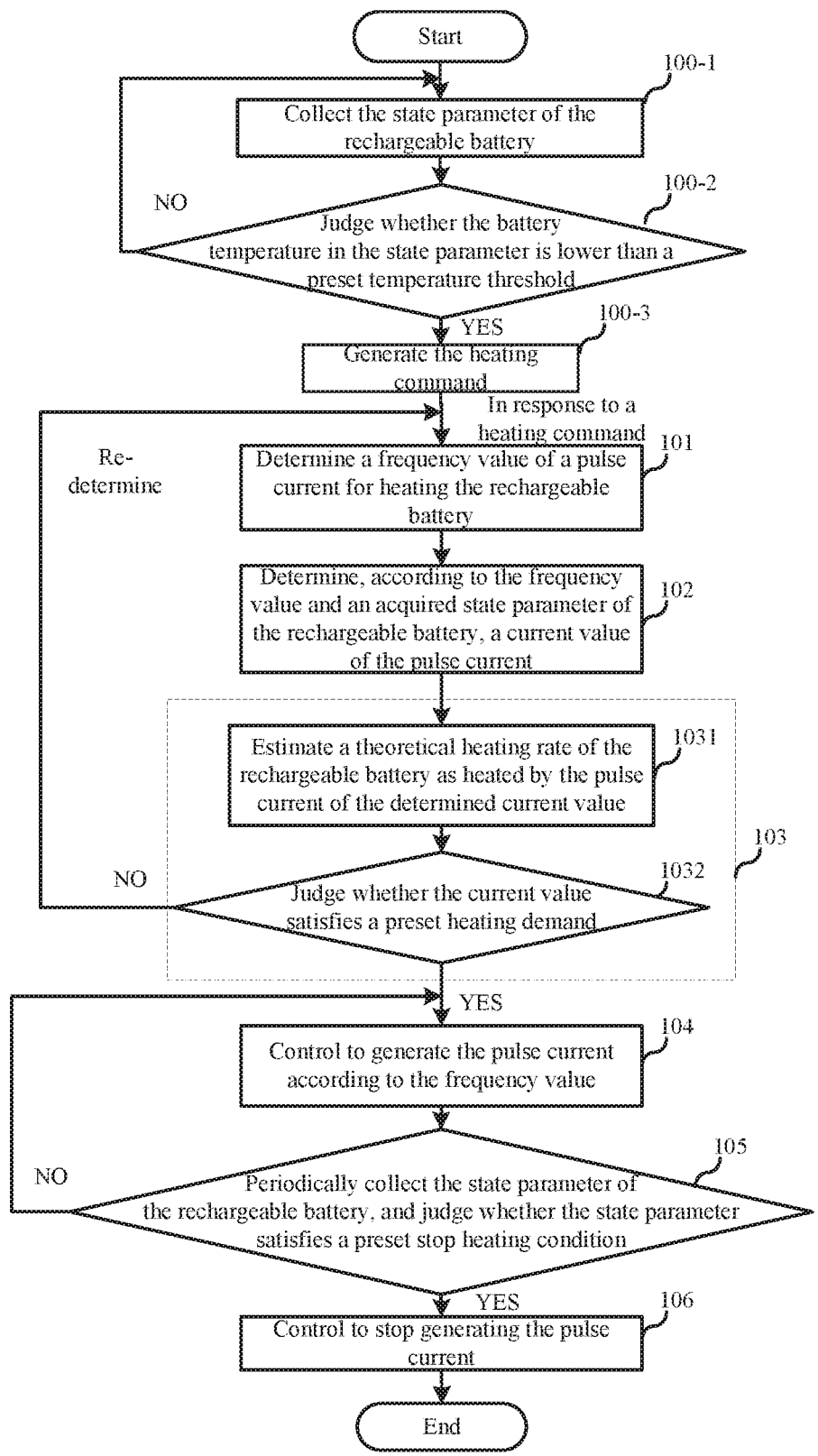
FIG. 6 is a specific flow chart of an example of judging whether to stop heating according to the present application.

In an example, as shown in FIG. 6, after step 104, the method further includes: step 105: collecting the state parameter of the rechargeable battery, and judging whether the state parameter satisfies a preset stop heating condition; when the state parameter satisfies the stop heating condition, proceeding to step 106: controlling to stop generating the pulse current; when the state parameter does not satisfy the stop heating condition, returning to step 104. That is, the control unit 13 may periodically collect the state parameter of the rechargeable battery and judge whether it is necessary to stop heating according to the state parameter. The state parameter includes the battery temperature; and the stop heating condition may be that, the battery temperature is greater than or equal to a preset target temperature. FIG. 6 is an improvement made on the basis of the example of FIG. 5, but it is not limited thereto; and FIG. 6 may also be an improvement made on the basis of FIG. 2 or FIG. 3.

In other examples, the control unit 13 may estimate the heating duration required for the rechargeable battery according to the current value of the pulse current; the control unit 13 controls to generate the pulse current at the frequency value, and stops heating after the heating duration. The estimated heating duration refers to a duration for which the rechargeable battery can reach the preset target temperature, as heated by the pulse current of the current value. an estimation method is, for example: according to the state parameter of the rechargeable battery collected by the control unit including the battery temperature, firstly calculating a temperature difference between the battery temperature and the target temperature; estimating the heating rate according to the current value of the pulse current; and calculating the required heating duration according to the heating rate and the temperature difference.

In the heating method for a rechargeable battery of the present disclosure, an actual current value may further be collected to adjust a frequency value.

Figure 7:
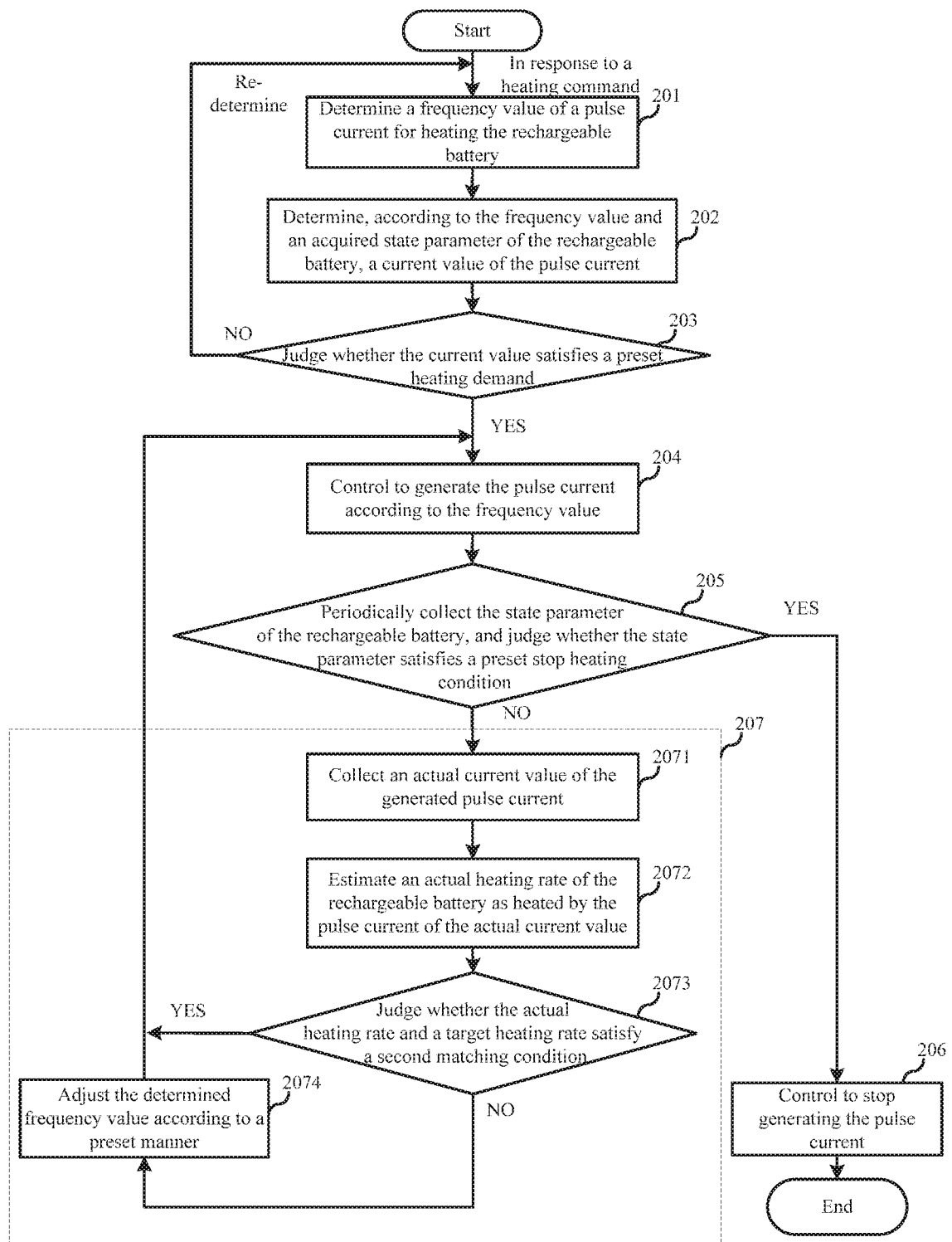
FIG. 7 is a flow chart of another heating method for a rechargeable battery according to the present application.

FIG. 7 shows the heating method for the rechargeable battery according to this embodiment, which is specifically as follows.

Step 201: determine a frequency value of a pulse current for heating the rechargeable battery.

Step 202: determine, according to the frequency value and an acquired state parameter of the rechargeable battery, a current value of the pulse current.

Step 203: judge whether the current value satisfies a preset heating demand; if YES, proceed to step 204; if NO, return to step 201.

Step 204: control to generate the pulse current according to the frequency value.

Step 205: periodically collect the state parameter of the rechargeable battery, and judge whether the state parameter satisfies a preset stop heating condition; if YES, proceed to step 206; if NO, proceed to step 207.

Step 206: control to stop generating the pulse current.

Step 207: detect and adjust, which specifically includes:

Sub-step 2071: collect an actual current value of the generated pulse current;

Sub-step 2072: estimate an actual heating rate of the rechargeable battery as heated by the pulse current of the actual current value;

Sub-step 2073: judge whether the actual heating rate and a target heating rate satisfy a second matching condition; if NO, proceed to step 2074; if YES, return to step 204.

Sub-step 2074: adjust the frequency value according to a preset manner; and return to step 204, wherein, when returning from sub-step 2074 to step 204, step 204 is specifically: controlling to generate the pulse current according to the adjusted frequency value.

Step 201 to step 206 are substantially the same as step 101 to step 106, and no details will be repeated here; the difference is that: step 207 is further included.

Specifically, after the control unit 13 controls to generate the pulse current according to the frequency value, the control unit 13 may further collect the actual current value in the heating circuit, and estimate the actual heating rate according to the actual current value. An estimation manner is similar to sub-step 1031, and no details will be repeated here. The second matching condition in sub-step 2073 may be that: a difference between the actual heating rate and the target heating rate is smaller than a preset second difference. The target heating rate in sub-step 2073 is the target heating rate in sub-step 1032; and the second difference may be set to be smaller than the first difference.

When the actual heating rate and the target heating rate satisfy the second matching condition, it indicates that the actual current value of the pulse current generated according to the frequency value is considered to be able to satisfy the heating demand, and at this time, adjustment is not required, and the pulse current is continuously generated under control according to the frequency value, that is, when the judgment result of sub-step 2073 is YES, the process directly returns to step 204. When the actual heating rate and the target heating rate do not satisfy the second matching condition, it indicates that the actual current value of the pulse current generated according to the frequency value is considered to be unable to satisfy the heating demand, at this time, the frequency value is adjusted according to a preset manner, and the pulse current is generated under control according to the adjusted frequency value, that is, the process proceeds to sub-step 2074.

Sub-step 2074 may specifically be: determining an adjustment manner according to a magnitude relationship between the actual heating rate and the target heating rate. It is assumed through experiments that, in a case where a hardware configuration of the heating circuit is invariant, the smaller the frequency value, the larger the current value, and the larger the heating rate; then, if the actual heating rate is smaller than the target heating rate, it indicates that the actual heating rate is too small, that is, it indicates that the current value is too small and the frequency value is too large; and therefore, the adjusted frequency value should be smaller than the frequency value determined last time. If the actual heating rate is larger than the target heating rate, it indicates that the actual heating rate is too large, that is, it indicates that the current value is too large, and the frequency value is too small; and therefore, the adjusted frequency value should be larger than the frequency value determined last time.

In an example, a step value may be set in the control unit 13; each time of adjustment is addition or deduction of one step value on the basis of the frequency value determined last time. For example, the frequency value determined this time is 1000 HZ, and the judgment result in step 2073 is that: the actual heating rate of heating at the actual current value is smaller than the target heating rate; then it indicates that the actual heating rate is too small, that is, it indicates that the current value is too small, the frequency value is too large, and the adjusted frequency value should be smaller than 1000 HZ and within a preset frequency range. If the set step value is 20, then the frequency value adjusted this time may be 980 HZ; next time, if the actual heating rate corresponding to the actual current value generated under control according to the frequency value of 980 HZ is still smaller than the target heating rate, then the frequency value may be adjusted to 960 Hz; so on and so forth.

In this embodiment, the frequency value may be re-determined according to the actual current value, and further the actual current value is adjusted, so that the actual heating rate corresponding to the actual current value is closer to the target heating rate; so as to achieve the heating demand more quickly. Step 207 may be executed periodically; that is, the actual current value may be continuously adjusted, so that the actual heating rate corresponding to the actual current value continuously approaches the target heating rate; until the state parameter of the rechargeable battery reaches the preset stop heating condition, to control to stop generating the pulse current. It should be noted that, in this embodiment, an order of the detection and adjustment step (step 207) and the step of collecting the state parameter of the rechargeable battery and judging whether it is necessary to stop heating according to the state parameter (step 205 to step 206) is not limited.

It should be noted that, FIG. 7 in this embodiment is an improvement made on the basis of FIG. 6, but it is not limited thereto, and this improvement made on the basis of FIG. 2, or FIG. 3, or FIG. 5.

In the heating method for the rechargeable battery, a frequency value may be determined according to a remaining power amount of the rechargeable battery.

Figure 8:
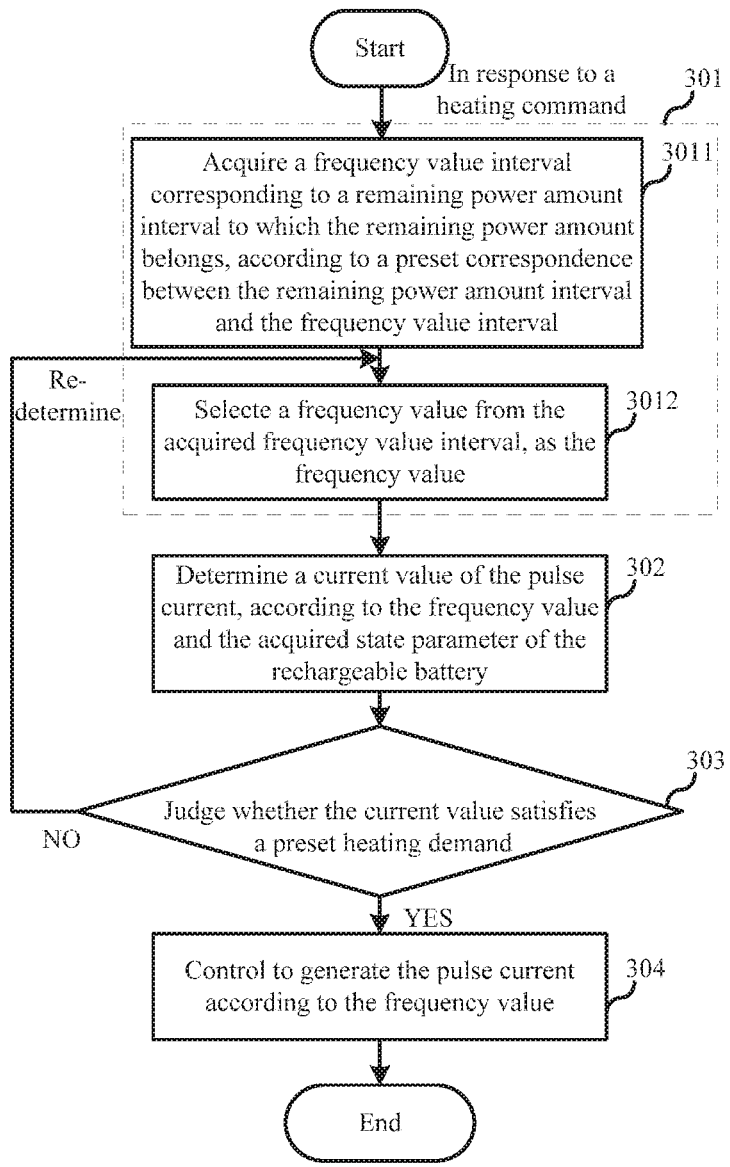
FIG. 8 is a flow chart of another heating method for a rechargeable battery according to the present application.

FIG. 8 is a flow chart of the heating method for the rechargeable battery according to the present application, which is specifically as follows.

Step 301: determine a frequency value of a pulse current for heating the rechargeable battery. The step 301 includes sub-steps of:

Sub-step 3011: acquire a frequency value interval corresponding to a remaining power amount interval to which the remaining power amount belongs, according to a preset correspondence between the remaining power amount interval and the frequency value interval; wherein, the remaining power amount of the rechargeable battery is the remaining power amount included in the acquired state parameter of the rechargeable battery;

Sub-step 3012: select a frequency value from the acquired frequency value interval, as the frequency value.

Step 302: determine a current value of the pulse current, according to the frequency value and the acquired state parameter of the rechargeable battery.

Step 303: judge whether the current value satisfies a preset heating demand; if YES, proceed to step 304; if NO, return to sub-step 3012 in step 301.

Step 304: control to generate the pulse current according to the frequency value.

Step 302 to step 304 are substantially the same as step 102 to step 104, and no details will be repeated here; the difference is that: specific implementation manners of step 301 and step 101 are different from each other.

Specifically, it can be known from the above-described Formula (1) that, the current value of the pulse current is related to the frequency value of the pulse current and the remaining power amount of the rechargeable battery, so the frequency value determined according to the remaining power amount is more correlated with the remaining power amount, so that the current value acquired according to the frequency value and the remaining power amount is closer to the required current value; that is, under a state of the remaining power amount, a current value of the pulse current that has a higher matching degree with the heating demand may be generated under control according to the frequency value; so that the frequency value of the pulse current that satisfies the heating demand can be determined more quickly according to the remaining power amount and the heating demand.

In consideration that the correspondence between the remaining power amount and the frequency value is not unique and there are many uncertain influence factors in the actual circuit, the correspondence between the remaining power amount interval and the frequency value interval may be preset; the correspondence refers to that, when the remaining power amount of the rechargeable battery is located within the remaining power amount interval, the pulse current is generated under control according to any frequency value within the frequency value interval corresponding to the remaining power amount interval, and a difference between the heating rate corresponding to the current value of the generated pulse current and the theoretical heating rate may be within a certain error range, for example, it may be smaller than a preset value. Therefore, in sub-step 3012, a frequency value may be arbitrarily selected as the frequency value from the frequency value interval corresponding to the remaining power amount interval to which the remaining power amount belongs; that is, when the judgment result in step 303 is NO, and it is necessary to re-determine the frequency value, a frequency value may be reselected from the frequency value interval corresponding to the remaining power amount interval to which the remaining power amount belongs; preferably, a step value may be set, and the re-determined frequency value may be a value incremented or decremented by the step value on the basis of the frequency value determined last time.

In the heating method for the rechargeable battery, when a remaining power amount of the rechargeable battery is different, a condition for judging whether it is necessary to heat is also different.

Figure 9:
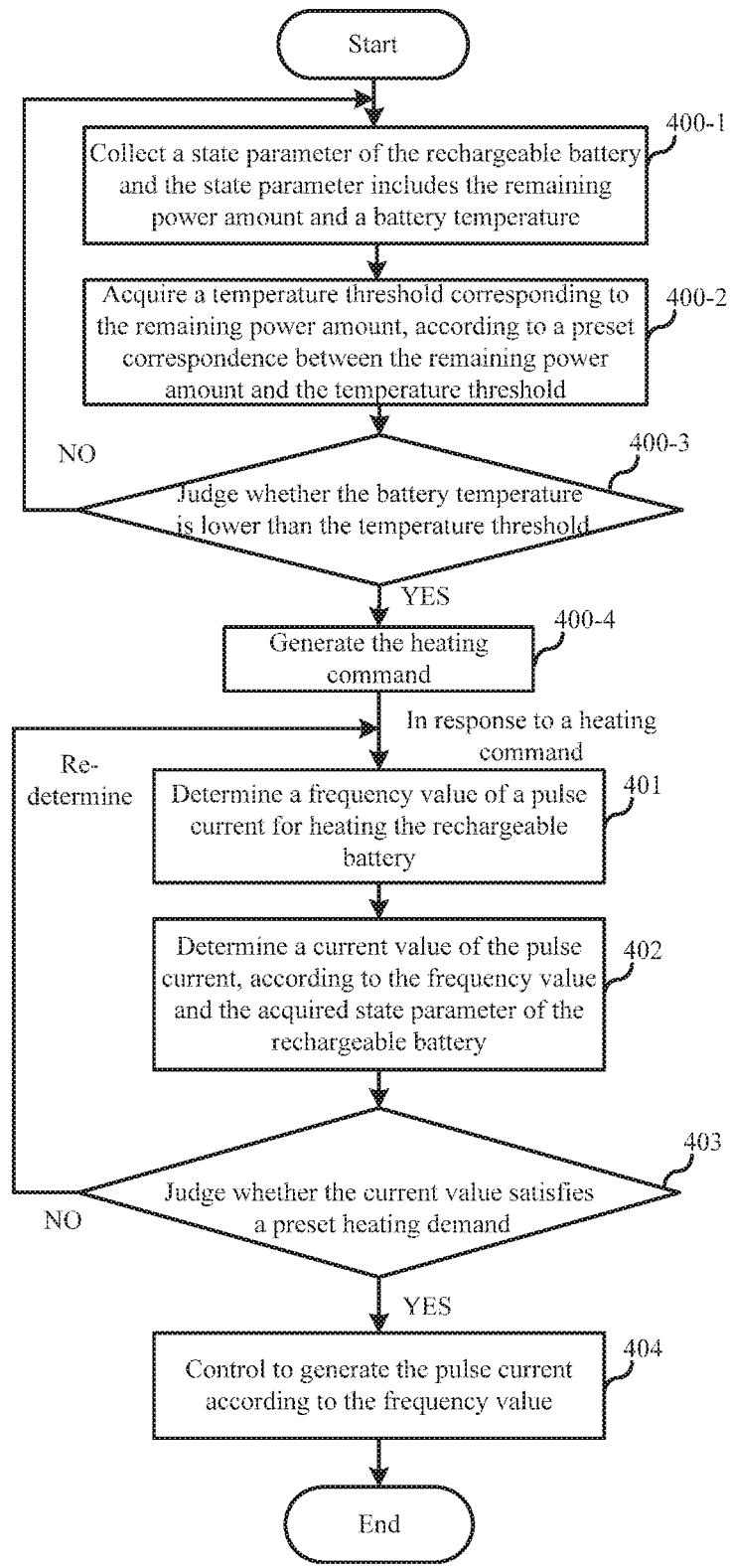
FIG. 9 is a flow chart of another heating method for a rechargeable battery according to the present application.

FIG. 9 is a flow chart of the heating method for the rechargeable battery according to the present application, which is specifically as follows.

Step 400-1: collect a state parameter of the rechargeable battery; wherein, the state parameter includes the remaining power amount and a battery temperature.

Step 400-2: acquire a temperature threshold corresponding to the remaining power amount, according to a preset correspondence between the remaining power amount and the temperature threshold.

Step 400-3: judge whether the battery temperature is lower than the temperature threshold; if YES, proceed to step 400-4, and if NO, return to step 400-1.

Step 400-4: generate a heating command.

Step 401: determine a frequency value of a pulse current for heating the rechargeable battery.

Step 402: determine a current value of the pulse current, according to the frequency value and the acquired state parameter of the rechargeable battery.

Step 403: judge whether the current value satisfies a preset heating demand; if YES, proceed to step 404; if NO, return to step 401.

Step 404: control to generate the pulse current according to the frequency value.

FIG. 9 is an improvement made on the basis of FIG. 3, wherein, step 400-4, step 401 to step 404 are substantially the same as step 100-3 and step 101 to step 104, and only differ in that: step 400-1, step 400-2 and step 400-3 are different from step 100-1 and step 100-2 in a manner of judging whether it is necessary to generate the heating command.

Considering that a polarization degree of the rechargeable battery is not only related to the battery temperature, but also related to the remaining power amount in the rechargeable battery, in this embodiment, the correspondence between the remaining power amount and the temperature threshold is preset; the collected state parameter of the rechargeable battery at least includes the remaining power amount and the battery temperature; the temperature threshold at which heating is required currently is determined according to the remaining power amount, and the battery temperature is compared with the temperature threshold to judge whether heating is required; so that the judgment of whether heating is required is more in line with actual needs.

The steps of the above-described various methods are divided only for the sake of clear description; when implemented, they may be merged into one step or some steps may be split into a plurality of steps; they are all within the scope of protection of the present disclosure as long as they include a same logical relationship; addition of insignificant modifications or introduction of insignificant design to an algorithm or a process without changing the core design of its algorithms and processes, falls within the scope of protection of the present disclosure.

Some embodiments of the present disclosure relate to a control unit in a heating circuit. Referring to FIG. 1, the heating circuit includes a rechargeable battery E, an energy storage unit 11, a switch unit 12 and a control unit 13; the rechargeable battery E, the energy storage unit 11 and the switch unit 12 are connected in series and form a loop; and the control unit 13 is connected to the switch unit 12.

The control unit is configured to execute the heating method for the rechargeable battery; wherein, the control unit 13 controls ON or OFF of the switch unit according to a frequency value, to generate a pulse current.

It is not difficult to find that, this embodiment is a system embodiment corresponding to the method embodiments, and this embodiment can be implemented in cooperation with the method embodiments. Related technical details as mentioned in the method embodiments are still effective in this embodiment, and no details will be repeated here in order to reduce repetition. Accordingly, the related technical details as mentioned in this embodiment may also be applied to the method embodiments.

For the control unit in the heating circuit, the control unit 13 is further connected, through a first sampling unit, to a loop formed by the rechargeable battery E, the energy storage unit 11 and the switch unit 12.

The control unit 13 is configured to execute a detection and adjustment step, after the pulse current is generated under control according to the frequency value. The control unit 13 executes the detection step, and specifically includes that: the control unit 13 is configured to collect an actual current value of the pulse current in the loop through a first collecting unit, and estimate an actual heating rate of the rechargeable battery as heated by the pulse current of the actual current value; the control unit 13 is further configured to judge whether the actual heating rate and a target heating rate satisfy a second matching condition; when it is judged that the second matching condition is not satisfied, the frequency value is adjusted according to a preset manner, and the pulse current is generated under control according to the adjusted frequency value.

In an example, the control unit 13 is further connected to the rechargeable battery E through a second sampling unit; the control unit 13 is further configured to collect a state parameter of the rechargeable battery through a second collecting unit, in response to a heating command for the rechargeable battery, before the frequency value of the pulse current for heating the rechargeable battery is determined; wherein, the state parameter includes a remaining power amount and a battery temperature; and the control unit 13 is further configured to acquire a temperature threshold corresponding to the remaining power amount, according to a preset correspondence between the remaining power amount and the temperature threshold; and if it is judged that the battery temperature is lower than the temperature threshold, generate the heating command.

In an example, the control unit 13 is further configured to periodically collect the state parameter of the rechargeable battery through the second sampling unit after the pulse current is generated under control according to the frequency value, and if it is judged that the state parameter satisfies the preset stop heating condition, control to stop generating the pulse current.

It is not difficult to find that, this embodiment is a system embodiment corresponding to the above method embodiments, and this embodiment can be implemented in cooperation with the above method embodiments. Related technical details as mentioned in the above method embodiments are still effective in this embodiment, and no details will be repeated here in order to reduce repetition. Accordingly, the related technical details as mentioned in this embodiment may also be applied to the above method embodiments. In an example, the control unit includes a memory which is used for storing a computer-executed instruction, and a processor which is connected with the memory by a bus. The processor executes the computer-executed instruction stored in the memory, so that the control unit executes the above described heating method for the rechargeable battery.

Some embodiments of the present disclosure relate to a heating circuit, referring to FIG. 1, the heating circuit includes a rechargeable battery E, an energy storage unit 11, a switch unit 12, and the control unit 13 described in the above-described control unit embodiments; the rechargeable battery E, the energy storage unit 11 and the switch unit 12 are connected in series and form a loop, and the control unit 13 is connected to the switch unit 12.

It is not difficult to find that, this embodiment is a system embodiment corresponding to the above control unit embodiments, and this embodiment can be implemented in cooperation with the above control unit embodiments. Related technical details as mentioned in the above control unit embodiments are still effective in this embodiment, and no details will be repeated here in order to reduce repetition. Accordingly, the related technical details as mentioned in this embodiment may also be applied to the above control unit embodiments.

It is worth mentioning that, respective modules involved in this embodiment are all logical modules; in practical application, a logical unit may be a physical unit, or a portion of a physical unit, or may also be implemented by a combination of a plurality of physical units. In addition, in order to highlight the innovative part of the present disclosure, this embodiment does not introduce a unit that is not closely related to solving the technical problem proposed by the present disclosure, but this does not mean that there are no other units in this embodiment.

What is claimed is:
1. A heating method for a rechargeable battery, comprising:
   acquiring, a state parameter of the rechargeable battery, wherein the state parameter comprises a remaining power amount;
   selecting, a frequency value from a frequency value interval, according to a preset correspondence between a remaining power amount interval and the frequency value interval, wherein the remaining power amount interval is an interval to which the remaining power amount belongs;
   determining, according to the frequency value and the remaining power amount, a current value of a pulse current;

estimating, a theoretical heating rate of the rechargeable battery as heated by the pulse current of the current value; and generating, the pulse current according to the frequency value, based on a first matching condition, wherein the first matching condition is that a difference between the theoretical heating rate and a target heating rate is less than a preset first difference.

2. The heating method for the rechargeable battery according to claim 1, wherein, the state parameter further comprises a battery temperature of the rechargeable battery;

wherein the selecting, a frequency value from a frequency value interval, according to a preset correspondence between a remaining power amount interval and the frequency value interval, comprises:

acquiring, a temperature threshold corresponding to the remaining power amount;

selecting, the frequency value from the frequency value interval, according to the preset correspondence between the remaining power amount interval and the frequency value interval, based on that the battery temperature is lower than the temperature threshold.

3. The heating method for the rechargeable battery according to claim 1, wherein, the estimating, a theoretical heating rate of the rechargeable battery as heated by the pulse current of the current value, comprises:

calculating, the theoretical heating rate according to the current value, mass of battery cells of the rechargeable battery, specific heat capacity of the battery cells of the rechargeable battery, and thermal conductivity of the battery cells of the rechargeable battery.

4. The heating method for the rechargeable battery according to claim 1, wherein the method further comprises:

collecting an actual current value of the pulse current;

estimating an actual heating rate of the rechargeable battery as heated by the pulse current of the actual current value; and wherein the generating, the pulse current according to the frequency value, based on a first matching condition, comprises:

generating, the pulse current according to the frequency value, based on the first matching condition and a second matching condition, wherein the second matching condition is that a difference between the actual heating rate and the target heating rate is less than a preset second difference.

5. The heating method for the rechargeable battery according to claim 4, wherein the method further comprises:

adjusting, the frequency value according to a preset manner, based on that the difference between the actual heating rate and the target heating rate is larger than the preset second difference, wherein the preset manner comprises addition or deduction of a step value on the frequency value.

6. The heating method for the rechargeable battery according to claim 4, wherein the preset second difference is less than the preset first difference.

7. The heating method for the rechargeable battery according to claim 1, wherein, the method further comprises:

estimating, a heating duration of the rechargeable battery according to the current value of the pulse current;

stopping, generating the pulse current after the heating duration.

8. The heating method for the rechargeable battery according to claim 7, wherein the state parameter further comprises a battery temperature of the rechargeable battery;

wherein the estimating, a heating duration of the rechargeable battery according to the current value of the pulse current, comprises:

calculating, a temperature difference between the battery temperature and a target temperature;

estimating, the heating rate according to the current value of the pulse current; and calculating, the heating duration according to the heating rate and the temperature difference.

9. The heating method for the rechargeable battery according to claim 1, wherein the state parameter further comprises a battery temperature of the rechargeable battery;

wherein the method further comprises:

stopping, generating the pulse current base on that the battery temperature is not lower than the temperature threshold.

10. A control unit in a heating circuit, wherein the control unit is configured to:

collect a state parameter of a rechargeable battery through a second collecting unit, wherein the state parameter comprises a remaining power amount;

select a frequency value from a frequency value interval, according to a preset correspondence between a remaining power amount interval and the frequency value interval, wherein the remaining power amount interval is an interval to which the remaining power amount belongs;

determine a current value of a pulse current according to the frequency value and the remaining power amount;

estimate a theoretical heating rate of the rechargeable battery as heated by the pulse current of the current value; and generate the pulse current through controlling ON or OFF of a switch unit according to the frequency value, based on a first matching condition, wherein the first matching condition is that a difference between the theoretical heating rate and a target heating rate is less than a preset first difference.

11. The control unit according to claim 10, wherein, the control unit is configured to:

collect the state parameter of the rechargeable battery through the second collecting unit, wherein the state parameter further comprises a battery temperature of the rechargeable battery;

the control unit is further configured to acquire a temperature threshold corresponding to the remaining power amount; and the control unit is specifically configured to: select the frequency value from the frequency value interval, according to the preset correspondence between the remaining power amount interval and the frequency value interval, when the battery temperature is lower than the temperature threshold, generate the heating command.

12. The control unit according to claim 10, wherein the control unit is specifically configured to:

calculate the theoretical heating rate according to the current value, mass of battery cells of the rechargeable battery, specific heat capacity of the battery cells of the rechargeable battery, and thermal conductivity of the battery cells of the rechargeable battery.

13. The control unit according to claim 10, wherein the control unit is further configured to:
collect an actual current value of the pulse current through a first collecting unit;
estimate an actual heating rate of the rechargeable battery as heated by the pulse current of the actual current value; and
the control unit is specifically configured to: generate the pulse current through controlling ON or OFF of the switch unit according to the frequency value, based on the first matching condition and a second matching condition, wherein the second matching condition is that a difference between the actual heating rate and the target heating rate is less than a preset second difference.

14. The control unit according to claim 13, wherein the control unit is specifically configured to:
generate the pulse current through controlling ON or OFF of the switch unit according to the frequency value, based on the first matching condition and a second matching condition, wherein the preset second difference is less than the preset first difference.

15. The control unit according to claim 13, wherein the control unit is further configured to:
adjust the frequency value according to a preset manner based on that a difference between the actual heating rate and the target heating rate is larger than the preset second difference, wherein the preset manner comprises addition or deduction of a step value on the frequency value.

16. The control unit according to claim 10, wherein the control unit is further configured to:
estimate a heating duration of the rechargeable battery according to the current value of the pulse current; and
stop generating the pulse current after the heating duration.

17. The control unit according to claim 16, wherein
the control unit is further configured to: collect the state parameter of the rechargeable battery through the second collecting unit, wherein the state parameter further comprises a battery temperature of the rechargeable battery;
the control unit is specifically configured to:
calculate a temperature difference between the battery temperature and a target temperature;
estimate the heating rate according to the current value of the pulse current; and
calculate the heating duration according to the heating rate and the temperature difference.

18. The control unit according to claim 16, wherein
the control unit is further configured to: collect the state parameter of the rechargeable battery through the second collecting unit, wherein the state parameter further comprises a battery temperature of the rechargeable battery;
the control unit is further configured to: stop generating the pulse current base on that the battery temperature is not lower than a temperature threshold.

19. A heating circuit, comprising: a rechargeable battery, an energy storage unit, a switch unit, and the control unit according to claim 10.

* * * * *